United States Patent
Tseng

[11] Patent Number: 5,846,286
[45] Date of Patent: Dec. 8, 1998

[54] METHOD FOR REMOVING $NO_X$ FROM A GAS STREAM WHILE PRODUCING AN ALKALINE EARTH NITRATE FERTILIZER COMPOSITION

[75] Inventor: Shiaw C. Tseng, Pittsburgh, Pa.

[73] Assignee: Dravo Lime Company, Pittsburgh, Pa.

[21] Appl. No.: 812,587

[22] Filed: Mar. 7, 1997

[51] Int. Cl.⁶ ............................. C05C 5/00; C05C 5/04
[52] U.S. Cl. ..................... 71/58; 423/235; 423/395
[58] Field of Search .................. 71/59, 60, 58; 423/243.08, 242, 235, 395; 204/177, 130

[56] References Cited

U.S. PATENT DOCUMENTS

| | | | |
|---|---|---|---|
| 783,570 | 2/1905 | Ellis et al. | 423/640 |
| 3,577,219 | 5/1971 | Shah | 23/168 |
| 3,650,692 | 3/1972 | Villiers-Fisher | 23/178 |
| 3,914,378 | 10/1975 | Selmeczi | 423/242 |
| 3,919,393 | 11/1975 | Selmeczi | 423/242 |
| 3,919,394 | 11/1975 | Selmeczi | 423/242 |
| 4,046,856 | 9/1977 | Itoo et al. | 423/166 |
| 4,193,971 | 3/1980 | Kawamata et al. | 423/242 |
| 4,255,402 | 3/1981 | Lowell | 423/242 |
| 4,367,211 | 1/1983 | Ray | 423/569 |
| 4,472,370 | 9/1984 | Miyata et al. | 423/639 |
| 4,525,197 | 6/1985 | Eibner et al. | 71/11 |
| 4,645,652 | 2/1987 | Kimura | 423/235 |
| 4,650,555 | 3/1987 | Rzad et al. | 204/174 |
| 4,657,738 | 4/1987 | Kanter et al. | 422/186.04 |
| 4,695,358 | 9/1987 | Mizuno et al. | 204/174 |
| 4,976,936 | 12/1990 | Rathi et al. | 423/242 |
| 4,996,032 | 2/1991 | Stowe, Jr. et al. | 423/242 |
| 5,039,499 | 8/1991 | Stowe, Jr. | 423/242 |
| 5,084,255 | 1/1992 | College et al. | 423/242 |
| 5,084,258 | 1/1992 | Lin | 423/244 |
| 5,147,516 | 9/1992 | Mathur et al. | 204/177 |
| 5,240,575 | 8/1993 | Mathur et al. | 204/177 |
| 5,284,557 | 2/1994 | Ukawa et al. | 204/130 |
| 5,458,748 | 10/1995 | Breault et al. | 204/177 |

FOREIGN PATENT DOCUMENTS

| | | | |
|---|---|---|---|
| 269060 | 6/1988 | European Pat. Off. | 71/59 |
| 620187 | 10/1994 | European Pat. Off. | 423/243.08 |
| 2127190 | 8/1973 | Germany . | |
| 359098-728-A | 6/1984 | Japan . | |
| 363004-833-A | 1/1988 | Japan . | |
| 1432044 | 10/1988 | U.S.S.R. | 71/59 |

OTHER PUBLICATIONS

A New Flue Gas Treatment System Based on Electron Beam Process. The Proceeding of the 21st International Technical Conference on Coal Utilization of Fuel Systems. Mar. 18–21, 1996, Clearwater, Florida U.S.A.

Pilot–scale Test For Electron Beam Purification of Flue Gas From Coal–combustion Boiler. 1995 $SO_2$ Control Symposium Book 3 (Mar. 28, 1995) Miami, Florida.

*Primary Examiner*—Wayne Langel
*Attorney, Agent, or Firm*—Armstrong, Westerman, Hattori, McLeland & Naughton

[57] ABSTRACT

A method of producing an alkaline earth nitrate fertilizer composition where a gas stream containing nitrogen oxides is treated to convert the nitrogen oxides to nitric acid and the gas stream then contacted with an aqueous medium containing an alkaline earth compound which reacts with the nitric acid to form an aqueous effluent solution of an alkaline earth nitrate. A portion of the aqueous effluent solution is used to form additional aqueous medium containing an alkaline earth compound for further contact with the gas stream, such that the concentration of alkaline earth nitrate in the aqueous effluent is increased.

10 Claims, 3 Drawing Sheets

METHOD FOR REMOVING $NO_x$ FROM A GAS STREAM WHILE PRODUCING AN ALKALINE EARTH NITRATE FERTILIZER COMPOSITION

CROSS-REFERENCE TO RELATED APPLICATIONS

The present application is related to application Ser. No. 08/706,657, filed Sep. 6, 1996, in the names of M. Babu and J. College, and entitled "Process For Removing $SO_2$ and $NO_x$ From A Gaseous Stream", pending, and to application Ser. No. 08/801,770, filed Feb. 18, 1997, also in the names of M. Babu and J. College and entitled "Aqueous Alkaline Earth Nitrate Fertilizer Composition and Process For Making The Same", pending, both applications being assigned to the assignee of the present application and both applications being incorporated by reference herein.

FIELD OF THE INVENTION

The present invention relates to a method for removing nitrogen oxides from a gas stream, such as a hot combustion gas stream, while producing calcium nitrate or magnesium nitrate in a concentrated aqueous solution.

BACKGROUND OF THE INVENTION

The removal of nitrogen oxides, as well as removal of sulfur dioxides, from hot combustion gas streams is becoming more necessary due to the need to reduce contaminants in the atmosphere which cause acid rain conditions.

Various processes have been proposed to remove nitrogen oxides from hot combustion gas streams. One such process involves the use of a coronal discharge system as described in U.S. Pat. No. 5,458,748, U.S. Pat. No. 5,240,575, and U.S. Pat. No. 5,147,516 to convert $NO_x$ in a gas stream to nitric acid. Another such process involves the use of an electron beam to remove $NO_x$, as well as sulfur dioxide, by conversion of the $NO_x$ to nitric acid.

In the related applications, hereinbefore identified, Ser. No. 08/706,657, filed Sep. 6, 1996 and Ser. No. 08/801,770, filed Feb. 18, 1997, processes are described which remove $NO_x$ from a gas stream with the attendant production of nitric acid, and the removal of nitric acid from the gas stream by reaction with an alkaline earth compound, such as calcium carbonate, calcium hydroxide or magnesium hydroxide, in an aqueous medium, to produce calcium nitrate or magnesium nitrate in an aqueous solution that is usable as a fertilizer composition. The fertilizer compositions so produced are aqueous solutions of an alkaline earth nitrate which, if they are to be concentrated, so as to increase the percent by weight of alkaline earth nitrate in water, would involve the cost of such concentration, e.g. provision of heat to remove water from the solution.

It is an object of the present invention to provide for the removal of nitric acid from a gas stream resulting from electron beam or coronal discharge treatment systems and formation of alkaline earth nitrate solutions therefrom, where the solutions are provided in a more concentrated form.

SUMMARY OF THE INVENTION

The present method enables the production of an alkaline earth nitrate fertilizer composition, such as a concentrated aqueous solution of calcium nitrate or magnesium nitrate, upon removal of nitric acid from a gas stream.

A gas stream, containing nitrogen oxides, is treated to convert the nitrogen oxides to nitric acid, preferably by contact with a coronal discharge or electron beam irradiation, and is then contacted with an aqueous medium containing an alkaline earth compound, such as calcium hydroxide, calcium carbonate, dolomite or magnesium hydroxide, which will react with nitric acid to form an alkaline earth nitrate. After contact of the gas stream containing nitric acid with the aqueous medium containing the alkaline earth compound, the clean gas is discharged and an aqueous effluent containing the alkaline earth nitrate in solution is removed from the wet scrubbing unit.

In accordance with the present method, a portion of the removed aqueous effluent containing alkaline earth nitrate in solution is used to form additional aqueous media containing an alkaline earth compound for further contact with a gas stream in the wet scrubbing unit.

A portion of the removed aqueous effluent solution containing alkaline earth nitrate is used to form additional aqueous medium containing an alkaline earth compound for further contact with the gas stream, such that the concentration of alkaline earth nitrate in the aqueous effluent is increased.

BRIEF DESCRIPTION OF THE DRAWING

The present invention will be more readily understood by reference to the accompanying drawings, which illustrate a preferred embodiment, and wherein.

DETAILED DESCRIPTION

Figure 1:
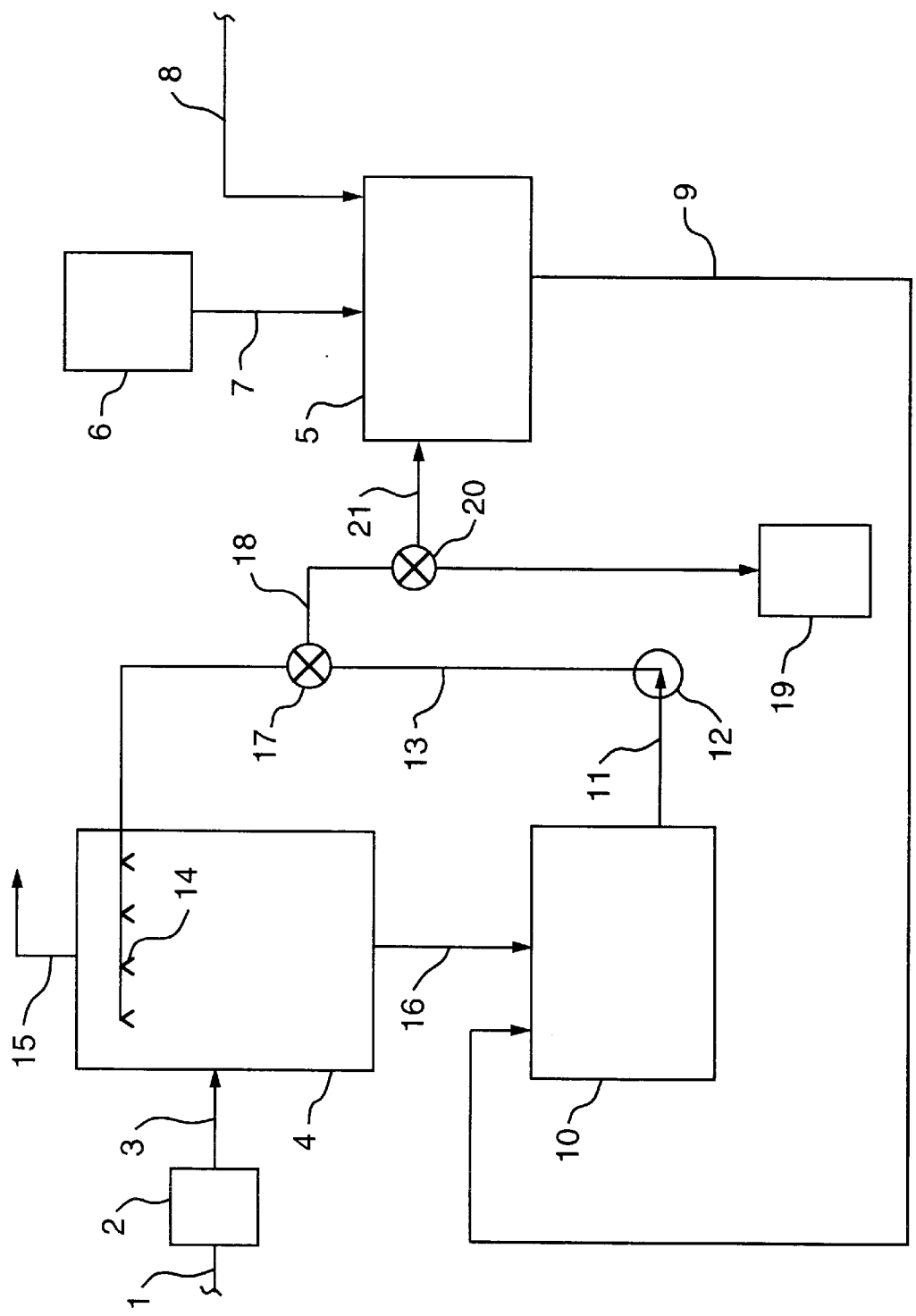
FIG. 1 is a schematic illustration of a preferred embodiment of the present invention.

The present method is an improved method of removing $NO_x$ from a gas stream where a concentrated aqueous solution of an alkaline earth nitrate is produced as a by-product.

In accordance with the present method, a gas stream, such as a hot combustion gas stream resulting from the combustion of coal, which contains nitrogen oxides ($NO_x$) is treated to convert the $NO_x$ to nitric acid.

One embodiment of such a treatment involves the contact of a gas stream containing $NO_x$, which has been substantially saturated with water, with a coronal discharge in a coronal discharge unit. The exposure of the humidified gas stream to a coronal discharge effects a reaction of $NO_x$ compounds to produce nitric acid which is entrained in the gas stream. The formation of nitric acid by use of a coronal discharge is believed to follow the following reaction sequence:

Production of oxidizing species by coronal discharge:

(1) $O_2$, $H_2O \rightarrow OH$, $O$, $HO_2$

Production of nitric acid:

(2)  $NO_x \xrightarrow{OH, O, HO_2} HNO_3$.

While various coronal discharge systems may be used in the present process, an especially useful system is that described in U.S. Pat. No. 5,458,748, the contents of said patent being incorporated by reference herein. The system described in that patent uses a sulfur tolerant, high water vapor tolerant, packing free coronal catalyst, and optionally suggests the use of downstream scrubbers of wet or dry configuration to absorb particular $NO_x$ reduction products $NO_2$ and $HNO_3$, upon exposure to an arresting agent, including basic, caustic, or alkali materials such as CaO or $NH_3$. Other coronal discharge systems for converting $NO_x$ to nitric acid are described in U.S. Pat. Nos. 5,147,516 and 5,240,575, the contents of both of which are incorporated by reference herein.

Another embodiment of a treatment of a gas stream containing $NO_x$, which has been substantially saturated with water, to produce nitric acid from the $NO_x$ uses an electron beam. Such treatment is known in the art and involves electron beam irradiation of the gas, the electron beam being a kind of ionizing radiation and a flow of electron accelerated by high voltage. In the electron beam process, the high-energy electrons hit the gases breaking them into ions and radicals, the reaction products having a high oxidation potential, with the radicals reacting with $NO_x$, in the presence of water, to produce nitric acid in the gas stream.

Referring now to the drawing which schematically illustrates the present method, a gas stream containing nitrogen oxides from line 1 is treated in a reactor 2 to convert the nitrogen oxides to nitric acid. The gas stream, now containing nitric acid, is passed through line 3 to a wet scrubbing unit 4. An aqueous medium containing an alkaline earth compound that will react with nitric acid to form an alkaline earth nitrate is formed in tank 5, such as a mixing tank, by addition of an alkaline earth compound from a source 6, through line 7 to tank 5 and admixture with water from a source (not shown) through line 8 to the tank 5. The aqueous medium containing an alkaline earth compound is then passed through line 9 to a recycle tank 10 associated with the wet scrubbing unit 4. Aqueous medium containing an alkaline earth compound from recycle tank 10 is passed through line 11 to pump 12 and then through line 13 to liquid injectors 14 located in the wet scrubbing unit 4. The aqueous medium containing an alkaline earth compound, injected through injectors 14 contacts the gas stream fed to the wet scrubbing unit 4 through line 3 and the alkaline earth compound reacts with nitric acid present in the gas stream to form an alkaline earth nitrate which dissolves in the aqueous medium. The clean gas is discharged from the wet scrubbing unit 4 through line 15, while the aqueous medium, now containing alkaline earth nitrate in solution, returns through line 16 to the recycle tank 10.

An aqueous effluent containing an alkaline earth nitrate in solution is removed through valve 17 and discharged through line 18 for collection in a collection tank 19. In accordance with the present method, at least a portion of the removed aqueous effluent containing an alkaline earth nitrate is removed through valve 20 and charged through line 21 to the tank 5 for use in forming the aqueous medium containing the alkaline earth compound, in lieu of at least a portion of water from line 8.

Figure 2:
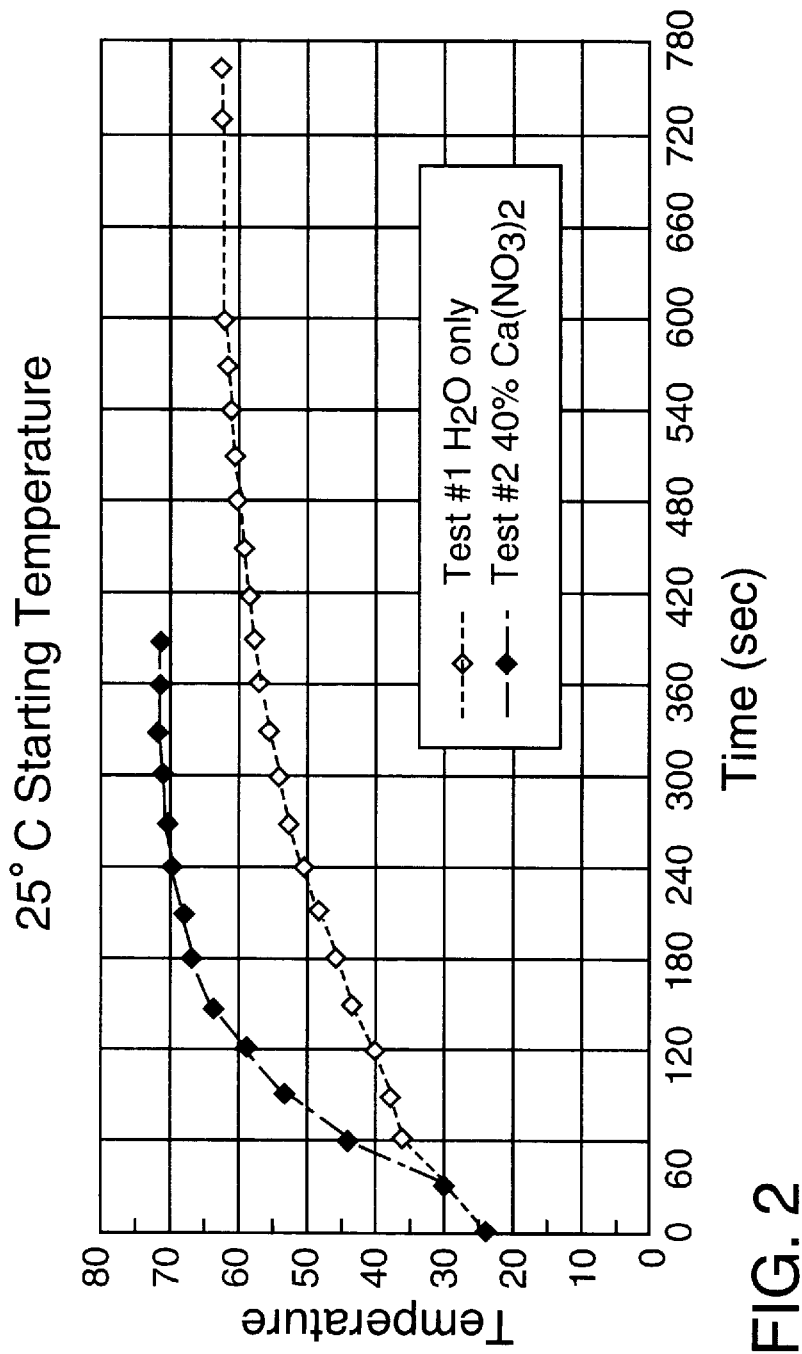
FIG. 2 graphically illustrates the affect of the presence of calcium nitrate in water used to slake lime at 25° C.
Figure 3:
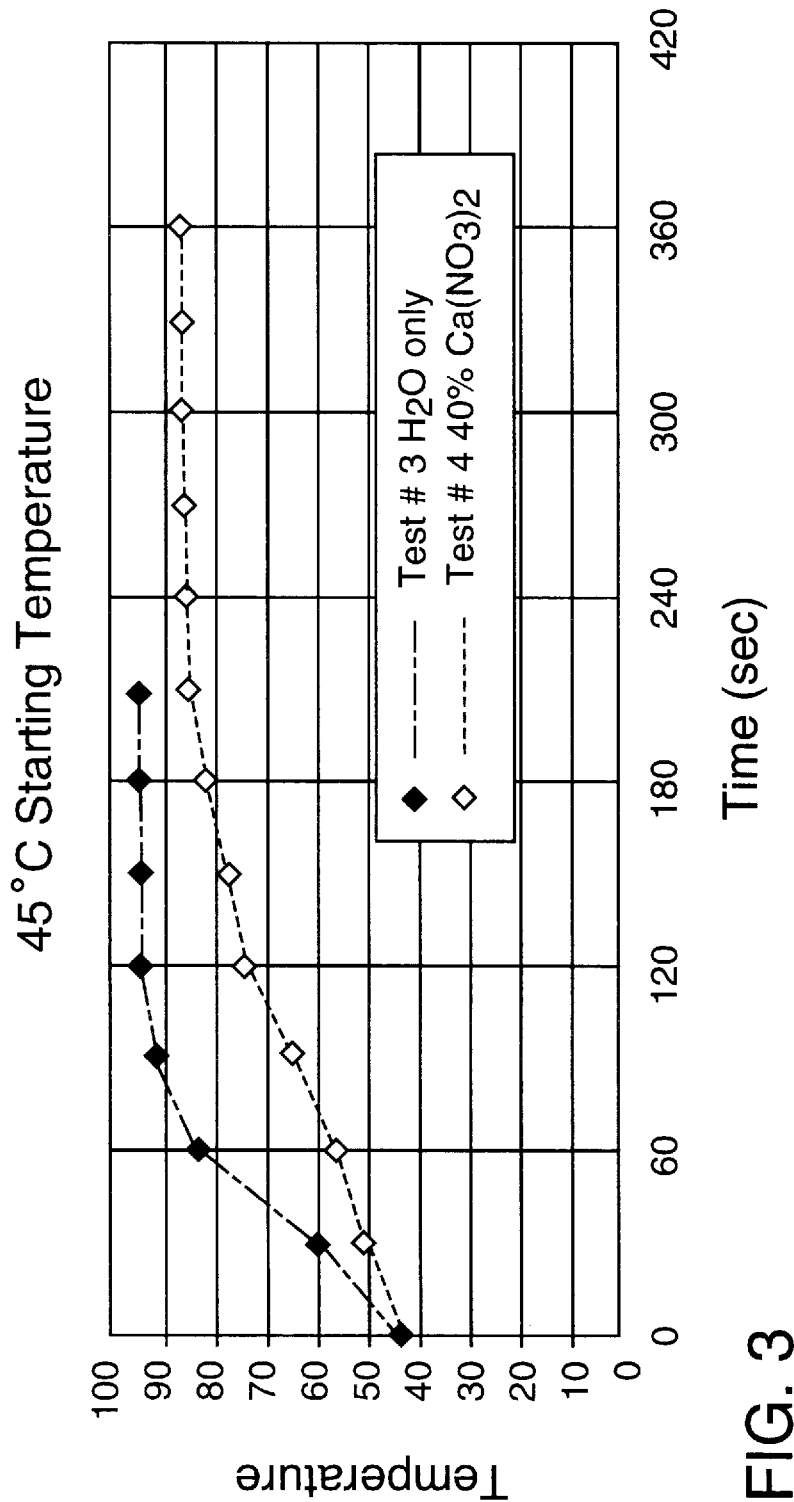
FIG. 3 graphically illustrates the affect of calcium nitrate in water used to slake lime at 45° C.

Slaking tests were conducted to show the affect of calcium nitrate addition to slaking water for lime slaking. Four tests were made using a lime having a composition of:

CaO=88–96.5 weight percent
MgO=2–5.5 weight percent
$SiO_2$=0.1–3 weight percent Two tests used water without addition of calcium nitrate and two tests were run using water containing 40 weight percent calcium nitrate. The results of the tests are plotted in FIGS. 2 and 3. FIG. 2 shows an initial temperature of the slaking water of about 25° C. while FIG. 3 shows an initial temperature of the slaking water of about 45° C. The results show clearly that with nitrate ions present, the slaking rates of the lime were faster at both temperatures. With an increase in the slaking rate provided according to the present method, a smaller slaking device can be used which would reduce the cost of equipment necessary.

What is claimed is:

1. A method of producing an alkaline earth nitrate fertilizer composition, by the removal of nitrogen oxides from a gas stream, comprising:

treating a humidified gas stream containing nitrogen oxides to convert said nitrogen oxides to nitric acid in said gas stream;

forming an aqueous medium containing an alkaline earth compound, selected from the group consisting of calcium hydroxide, calcium carbonate, dolomite and magnesium hydroxide, which will react with nitric acid to form an alkaline earth nitrate, by adding said alkaline earth compound to water;

contacting said humidified gas stream containing nitric acid in a wet scrubbing unit with said aqueous medium containing said alkaline earth compound to form an alkaline earth nitrate in an aqueous effluent from said wet scrubbing unit;

separating said gas stream from the wet scrubbing unit and removing aqueous effluent containing said alkaline earth nitrate so formed from said wet scrubbing unit; and adding at least a portion of said removed aqueous effluent containing said alkaline earth nitrate to additional said aqueous medium containing said alkaline earth compound, such that said additional aqueous medium so produced contains removed aqueous effluent containing alkaline earth nitrate, for contact with additional gas stream containing nitric acid, such that an increase in the concentration of the alkaline earth nitrate is provided in the aqueous effluent removed from said wet scrubbing unit.

2. The method of producing an alkaline earth nitrate fertilizer composition, by the removal of nitrogen oxides from a gas stream, as defined in claim 1 wherein said alkaline earth compound is calcium carbonate.

3. The method of producing an alkaline earth nitrate fertilizer composition, by the removal of nitrogen oxides from a gas stream, as defined in claim 1 wherein said alkaline earth compound is calcium hydroxide.

4. The method of producing an alkaline earth nitrate fertilizer composition, by the removal of nitrogen oxides from a gas stream, as defined in claim 1 wherein said alkaline earth compound is magnesium hydroxide.

5. The method of producing an alkaline earth nitrate fertilizer composition, by the removal of nitrogen oxides from a gas stream, as defined in claim 1 wherein said humidified gas stream containing nitrogen oxides is treated by subjection to a coronal discharge to convert said nitrogen oxides to nitric acid.

6. The method of producing an alkaline earth nitrate fertilizer composition, by the removal of nitrogen oxides from a gas stream, as defined in claim 1 wherein said humidified gas stream containing nitrogen oxides is treated by subjection to electron beam irradiation to convert said nitrogen oxides to nitric acid.

7. The method of producing an alkaline earth nitrate fertilizer composition, by the removal of nitrogen oxides from a gas stream, as defined in claim 1 wherein said alkaline earth nitrate formed is calcium nitrate.

8. The method of producing an alkaline earth nitrate fertilizer composition, by the removal of nitrogen oxides from a gas stream, as defined in claim 1 wherein said alkaline earth nitrate formed is magnesium nitrate.

9. A method of producing a calcium nitrate fertilizer composition, by the removal of nitrogen oxides from a gas stream, comprising:

treating a humidified gas stream containing nitrogen oxides, by exposing the same to a coronal discharge or electron beam irradiation, to convert said nitrogen oxides to nitric acid in said gas stream;

forming an aqueous medium containing calcium hydroxide which will react with nitric acid to form calcium nitrate, by adding said calcium hydroxide to water;

contacting said humidified gas stream containing nitric acid in a wet scrubbing unit with said aqueous medium containing said calcium hydroxide to form calcium nitrate in an aqueous effluent from said wet scrubbing unit;

separating said gas stream from the wet scrubbing unit and removing aqueous effluent containing said calcium nitrate so formed from said wet scrubbing unit; and adding at least a portion of said removed aqueous effluent containing said calcium nitrate to additional said aqueous medium containing said calcium hydroxide, such that said additional aqueous medium so produced contains removed aqueous effluent containing calcium nitrate, for contact with additional gas stream containing nitric acid.

10. A method of producing a magnesium nitrate fertilizer composition, by the removal of nitrogen oxides from a gas stream, comprising:

treating a humidified gas stream containing nitrogen oxides, by exposing the same to a coronal discharge or electron beam irradiation, to convert said nitrogen oxides to nitric acid in said gas stream;

forming an aqueous medium containing magnesium hydroxide, which will react with nitric acid to form magnesium nitrate, by adding said magnesium hydroxide to water;

contacting said humidified gas stream containing nitric acid in a wet scrubbing unit with said aqueous medium containing said magnesium hydroxide to form magnesium nitrate in an aqueous effluent from said wet scrubbing unit;

separating said gas stream from the wet scrubbing unit and removing aqueous effluent containing said magnesium nitrate so formed from said wet scrubbing unit; and adding at least a portion of said removed aqueous effluent containing said magnesium nitrate to additional said aqueous medium containing said magnesium hydroxide, such that said additional aqueous medium so produced contains removed aqueous effluent containing magnesium nitrate, for contact with additional gas stream containing nitric acid.

\* \* \* \* \*